United States Patent [19]
Mullen, Jr.

[11] Patent Number: 5,405,172
[45] Date of Patent: Apr. 11, 1995

[54] PLASTIC LIQUID TIGHT CONNECTOR FOR CABLE, TUBES OR RODS

[75] Inventor: Thomas M. Mullen, Jr., Dunellen, N.J.

[73] Assignee: Heyco Molded Products, Inc., Kenilworth, Tex.

[21] Appl. No.: 60,042

[22] Filed: May 13, 1993

[51] Int. Cl.⁶ .............................. F16L 55/00
[52] U.S. Cl. ........................ 285/92; 285/161; 285/323; 285/343; 174/65 SS
[58] Field of Search ............... 285/322, 323, 161, 92, 285/81, 343; 174/65 SS

[56] References Cited

U.S. PATENT DOCUMENTS

| | | | |
|---|---|---|---|
| 114,484 | 5/1871 | Smith . | |
| 2,547,318 | 4/1951 | Harding | 285/123 |
| 3,796,504 | 3/1974 | Marechal | 403/288 |
| 3,895,832 | 7/1975 | Ellis et al. | 285/322 |
| 4,145,075 | 3/1974 | Holzmann | 285/81 |
| 4,250,348 | 2/1981 | Kitagawa | 285/161 X |
| 4,350,840 | 9/1982 | Michaels | 285/343 X |
| 4,358,079 | 11/1982 | Navarro | 248/56 |
| 4,513,172 | 4/1985 | Matsui | 174/65 SS |
| 4,600,803 | 7/1986 | Holzmann | 285/343 X |
| 4,767,135 | 8/1988 | Holzmann | 285/27 |
| 4,787,657 | 11/1988 | Henniger | 285/323 |
| 5,048,872 | 9/1991 | Gehring | 285/92 |

FOREIGN PATENT DOCUMENTS

| | | | |
|---|---|---|---|
| 322625 | 7/1989 | European Pat. Off. | 285/322 |
| 2335137 | 7/1977 | France | 285/323 |

*Primary Examiner*—Dave W. Arola
*Attorney, Agent, or Firm*—Auslander & Thomas

[57] ABSTRACT

A liquid tight connector for pass through cable, tubing or rods includes a body, a compression nut and a gland. There are fingers on the body with flats and triangular ends which cradle the gland and grasp cable, tubing or rods in a liquid tight manner tightly enough to provide strain relief. Spherical bumps with pawl like flats hold the compression nut free of the likelihood of loosening once engaged. The triangular configuration of the ends of the fingers enables improved strain relief and adapts to a large selection of cable, tubing or rod diameters.

14 Claims, 8 Drawing Sheets

FIG.1
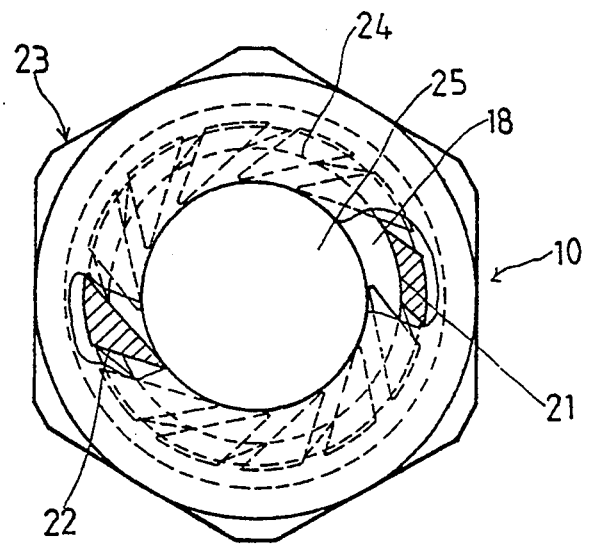
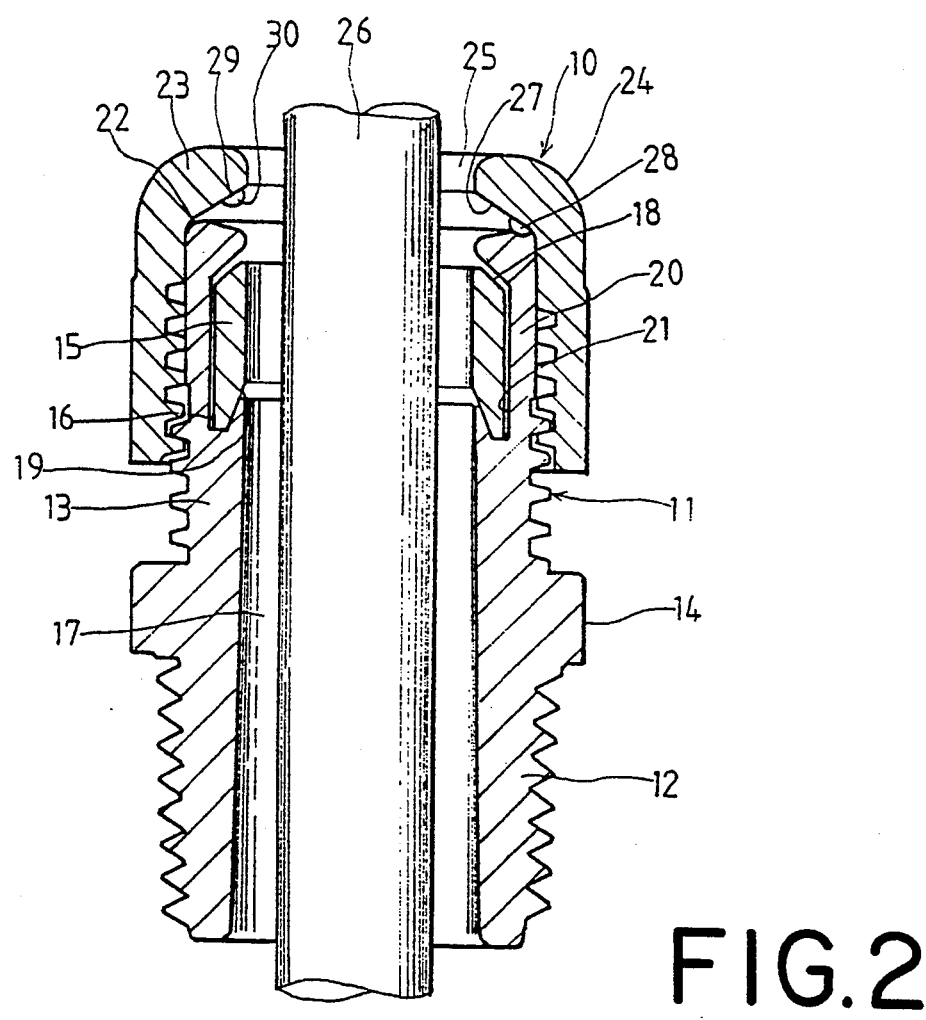
FIG.2

PLASTIC LIQUID TIGHT CONNECTOR FOR CABLE, TUBES OR RODS

BACKGROUND OF THE INVENTION

The present invention is a plastic liquid tight connector for cable, tubes or substantially elongated round objects such as rods. The liquid tight connector has a compression nut, conical internal surface to engage fingers in liquid tight engagement with a gland and to directly hold cable, tubes or rods in both liquid tight and strain relief engagement. Flat sided spherical bumps within the conical internal surface keep the compression nut from vibrating loose. The triangular configuration of the finger with its rounded base, enables a wide range of diameters of cable, tubes or rods that can be held liquid tight and in strain relief engagement, reducing the number of liquid tight connector sizes that have to be provided to cover the spectrum of use for the liquid tight connector.

The connector is specific for a connector to engage a cable, tube or rod in the connector, passing through the connector in liquid tight and strain relief engagement. The connector is engagable in an opening or aperture in liquid tight engagement.

The art of liquid tight connectors, couplers, and fittings for cable, tubes or rods is broken down into many separate arts with separate uses and needs. In the liquid tight field there are connectors for attaching cable or tubing to a box, aperture or wall. The connector may be for receiving the butt end of a cable, tube or rod. In the case of tubing the tubing may be hollow as a conduit. If the tubing is a conduit, it may be metal or plastic and then the metal may be in different conditions such as helical or an integral tube. If the conduit is plastic it may be corrugated, laminated, helical or reenforced. Connectors for cable, tubing or even rods may have to take into account electrical characteristics such as insulative or conductive.

The present invention is a plastic molded liquid tight connector that is non conductive and makes a liquid tight connection in an opening. The connector is engagable over cable, tubing or a rod which passes through it. The connector is separately engagable in an opening or aperture in a liquid tight condition and is separately able to engage the cable, tube or rod in a liquid tight manner.

The connector of the present invention includes a body and a compression nut and is an improvement over the prior art in its ability to engage the cable, tube or rod in a liquid tight manner tightly enough to provide strain relief and free of the likelihood of loosening once tightened.

Both the present invention and prior art liquid tight connectors with conduits generally have extended end portions which fit through apertures in a housing or junction box or other device where the connector is fixed, then sealed against the entry of liquids through the connector, and past the conduit.

The liquid tight connector of the present invention is adapted to receive both conductive and non conductive cable, tubes or rods which pass through it. Since the liquid tight connector is plastic and non conductive it can be used in electrical and non electrical systems and with fluid conduits also.

DESCRIPTION OF THE RELATED ART

Annexed hereto is Form PTO-1449 and copies of the patents cited therein.

The prior art of circumferential grasping of cable, tubes or rods is old and is well known.

U.S. Pat. No. 114,484 is exemplary of just the circumferential grasping of a tube.

U.S. Pat. No. 2,547,318 is exemplary of a complex prior art metallic pipe coupling, liquid tight connector as distinguished from a pass through liquid tight connector of the present invention which employs a threaded compression lock nut, a gland and grasping fingers.

U.S. Pat. No. 3,796,504 is exemplary of a complex prior art clamping system using fingers to grasp a pass through cable in a non liquid tight connector which has a conical internal surface and compressible grasping fingers.

U.S. Pat. No. 3,895,832 is exemplary of a prior art metallic pipe coupling, liquid tight connector as distinguished from a pass through liquid tight connector of the present invention which employs a threaded compression lock nut, a sealing gasket and collet with grasping fingers.

U.S. Pat. No. 4,145,075 discloses a prior art plastic, cable or tube liquid tight connector of a pass through type which employs a threaded compression lock nut with a conical internal surface, compressible grasping fingers and a gland. The fingers extend along the longitudinal axis of the liquid tight connector parallel to the gland. The fingers have angulated slots between them. The lock nut is protected against vibrational loosening by longitudinal slots.

U.S. Pat. No. 4,250,348 discloses a prior art, apparently plastic, cable or tube which is apparently a liquid tight connector of a pass through type which employs a threaded compression lock nut with a sloped internal surface, compressible grasping fingers and a gland like packing. The fingers extend along the longitudinal axis of the liquid tight connector parallel to the packing. The fingers have slots between them. The lock nut is protected against vibrational loosening by longitudinal fixing projections. There are flexible fingers which fit around the packing and the cable or tube. Each of the fingers are radially closable. On the inside of each finger are protrusions to engage the packing and the cable or tube. The fingers have notches to engage the fixed projections to avoid loosening.

U.S. Pat. No. 4,358,079 discloses a prior art cable, liquid tight connector of a pass through type which employs a threaded compression lock nut with a conical internal surface, compressible grasping fingers and an elastomeric member. The fingers extend along the longitudinal axis of the liquid tight connector parallel to the member. The fingers have wide slots between them. There is no lock nut protection against vibrational loosening. The flexible fingers fit around the outside of the member and they engage the cable, radially closable on the cable. On the inside of each finger are protrusions to engage the cable.

U.S. Pat. No. 4,513,172 discloses a prior art cable fixing, liquid resistant connector of a pass through type which employs a threaded compression lock nut and compressible grasping fingers against which the lock nut can react. There is a separate bell like liquid resistant member. The fingers have wide slots between them. There is no lock nut protection against vibrational loosening. The flexible fingers fit around the outside of the cable and they engage the cable, radially closable on the cable.

U.S. Pat. Nos. 4,600,803 and 4,767,135 disclose a prior art plastic, cable or tube liquid tight connector of a pass through type which employ a threaded compression lock nut with a conical internal surface, compressible grasping fingers and a gland. The fingers extend along the longitudinal axis of the liquid tight connector parallel to the gland. The patents are similar to the U.S. Pat. No. 4,145,075. There different finger configurations have angulated slots between them.

U.S. Pat. No. 4,787,657 discloses a prior art cable, liquid tight connector of a pass through type which employs a threaded compression lock nut with a conical internal surface, compressible grasping fingers and an elastomeric member. The fingers extend along the longitudinal axis of the liquid tight connector parallel to the member. The fingers have spaced slots between them. There is no lock nut protection against vibrational loosening. The flexible fingers fit around the outside of the member and they engage the member radially closable over the member. The inside of each finger alternate protrusions to engage the sealing member, alternately over riding it. The triangular configuration along the length of the fingers allows them to be closed on to the sealing member. Alternate protrusions on the fingers serve as stops against over tightening.

U.S. Pat. No. 5,048,872 is like U.S. Pat. Nos. 4,145,075, 4,600,803 and 4,767,135 and is plastic, cable or tube liquid tight connector of a pass through type which employs a threaded compression lock nut with a conical internal surface, compressible grasping fingers and a gland. The fingers have angulated slots between them. The fingers extend along the longitudinal axis of the liquid tight connector parallel to the gland. The lock nut is protected against vibrational loosening by angulated longitudinal slots which engage the compressed fingers. The fingers have flat inner portions and upper ends which over ride the gland.

According to the present invention a liquid tight connector, fixable in an opening is engagable with a substantially elongated round object fixable, in liquid tight engagement in the liquid tight connector. The liquid tight connector has a body with a front portion and an end portion and an internal passage. The front portion has threads, the end portion is liquid tight engagable in an opening. The body has a set of circumferential fingers at the front portion. The fingers have flats and ends. There is a gland in the front portion surrounding the passage. The gland is cradled by the flats and the ends. The connector has a compression nut with threads, a conical internal surface, and an opening. The ends of the fingers are triangular. There is at least one spherical bump on the conical internal surface of the compression nut which has a flat to act as a pawl to engage the fingers as they cam them over the spherical bumps as the compression nut is screwed down.

The body may have a shoulder between the end portion and the front portion and the triangular finger ends may have apices which normally extending over the gland. The apices are substantially tangent to the passage. The fingers have both ends and flats spaced apart by slots. The slots normally include adjacent sides of the ends and one side of each the slot at the end is on a plane substantially tangent to the circumference of the passage. The ends have a base which may be rounded.

The compression nut may have a dome which may have a notch at the opening. The notch may extend from the dome to the conical internal surface. The notch may also have a fiat.

The compression nut may have two spherical bumps, an upper and lower bump. The gland may have at least one bevel, which may be a front end bevel and a rear end bevel.

Although such novel feature or features believed to be characteristic of the invention are pointed out in the claims, the invention and the manner in which it may be carried, may be further understood by reference to the description following and the accompanying drawing.

BRIEF DESCRIPTION OF THE DRAWING

FIG. 1 is a top plan view of the liquid tight connector of the present invention in open position partially cut away.

FIG. 2 is an elevated sectional view of FIG. 1.

Referring now to the figures in greater detail, where like reference numbers denote like parts in the various figures.

Figure 3:
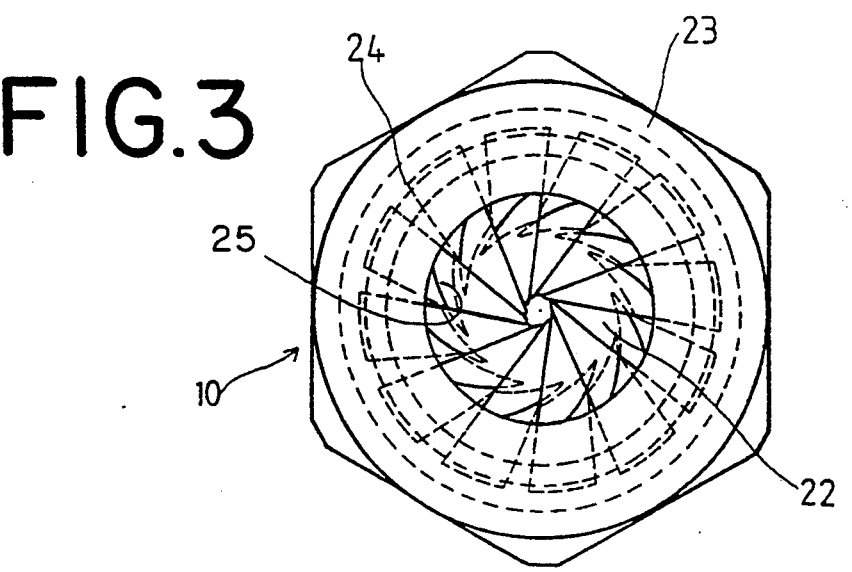
FIG. 3 is a top plan view of the liquid tight connector of FIG. 1 in closed position.
Figure 4:
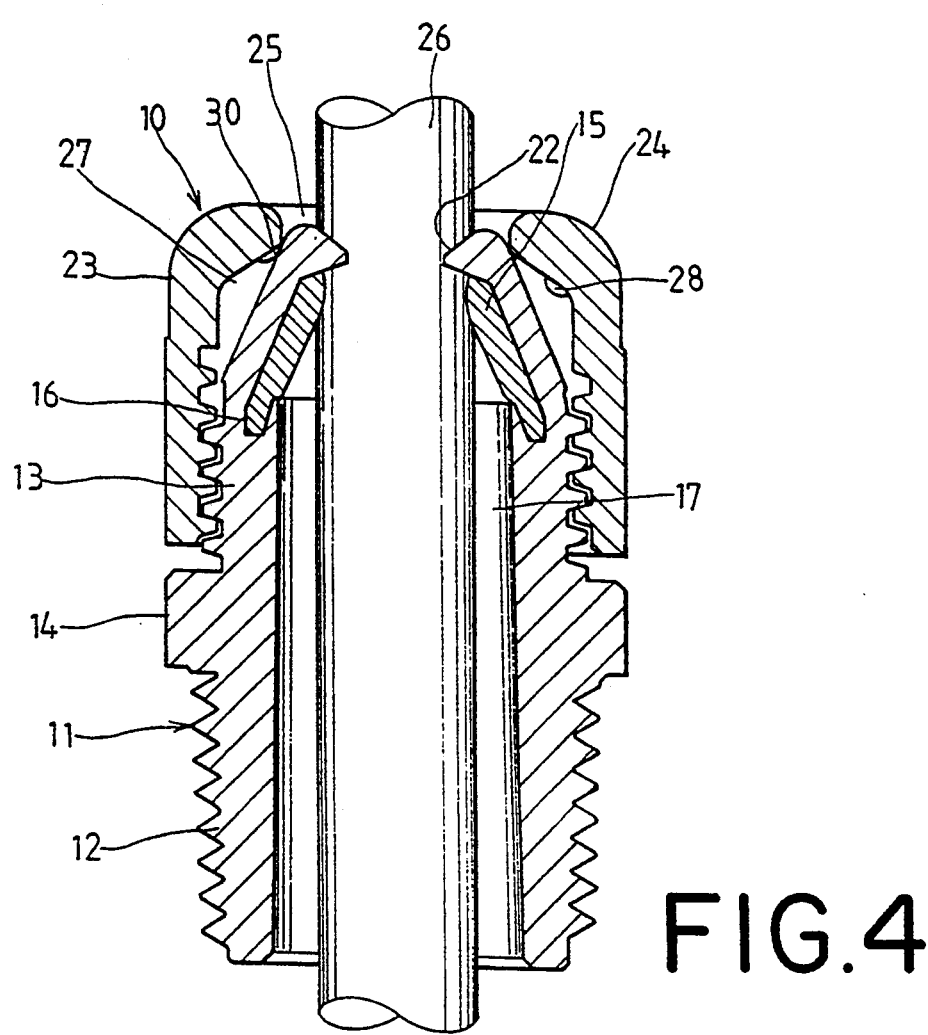
FIG. 4 is an elevated sectional view similar to FIG. 3 including a cable.
Figure 5:
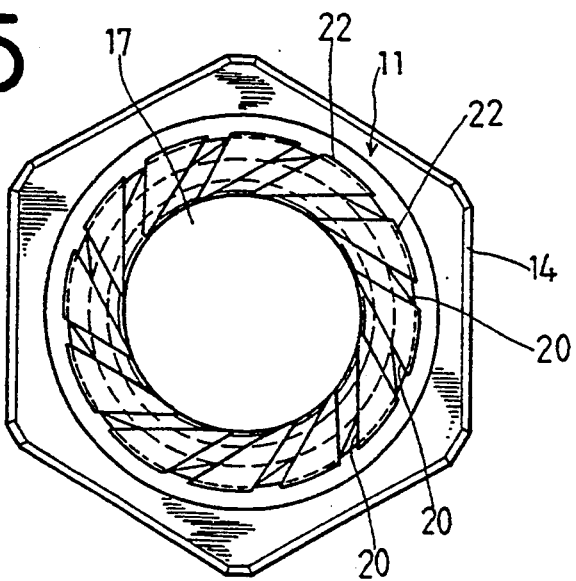
FIG. 5 is a top plan view of the body of the liquid tight connector of the present invention.
Figure 6:
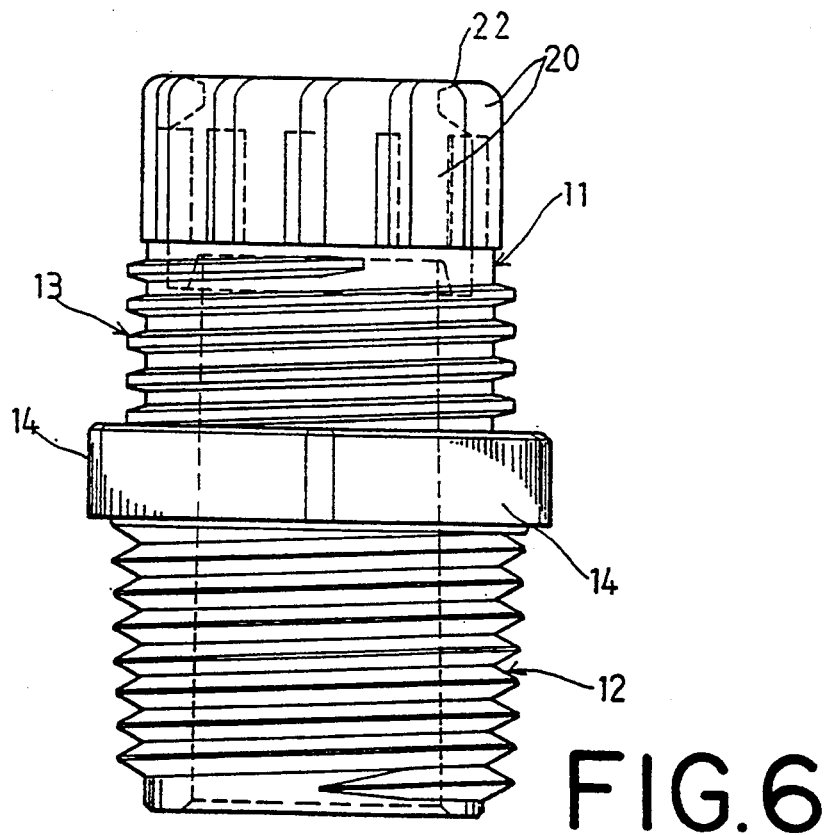
FIG. 6 is an elevation view of the body of the liquid tight connector of FIG. 5.
Figure 7:
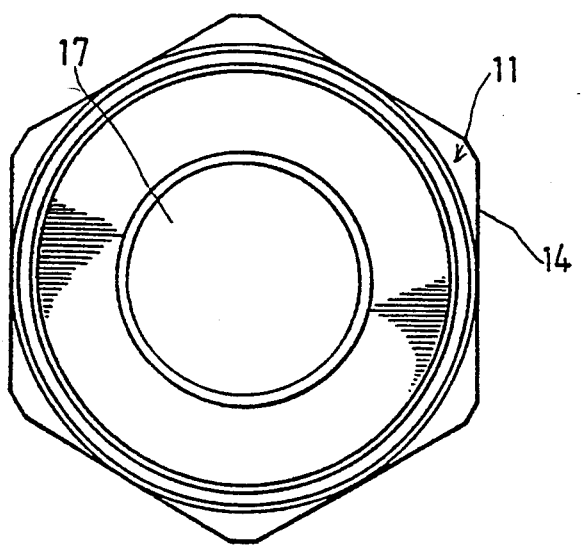
FIG. 7 is a bottom plan view of the body of the liquid tight connector of FIG. 5.
Figure 8:
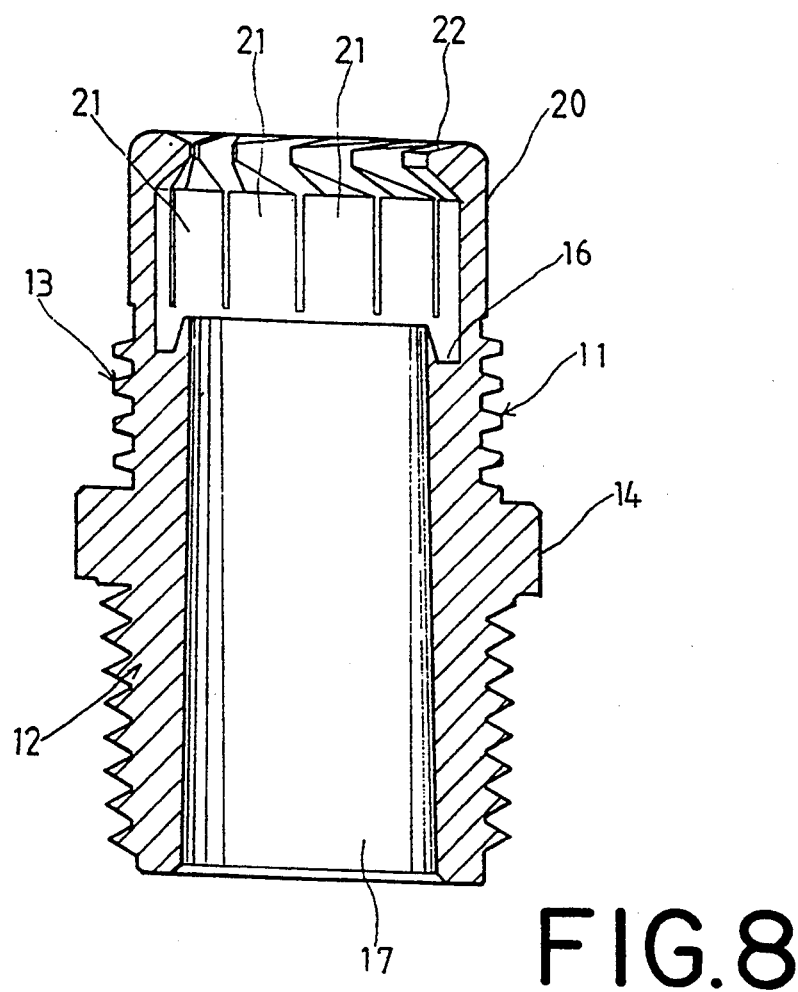
FIG. 8 is an elevated sectional view of FIG. 6.

The liquid tight connector 10, as shown in FIGS. 1–13, comprises a body 11 having an end portion 12 and a front portion 13. The end portion 12 and front portion 13 are separated by a shoulder 14. A gland 15 is engaged inside the front portion 13. The gland 15 is engaged in an annular channel 16. The body 11 is hollow, having a central passage 17 therethrough.

The gland 15 has a front end bevel 18 and a rear end bevel 19. The body 11 has resilient fingers 20. The fingers 20 have inwardly facing flats 21 and inwardly extending triangular ends 22.

A threaded compression nut 23 has a dome 24 with an opening 25, through which an elongated round object 26 such as a cable, tube or rod may pass. The end bevel 19 of the gland 15 is engaged in the annular channel 16 of the front portion 13 of the body 11 within the fingers 20, with the flats 21 opposing the gland 15 and the gland 15 positioned beneath the triangular ends 22 of the fingers 20. The inside of the dome 24 of the compression nut 23 has a conical internal surface 27.

Figure 9:
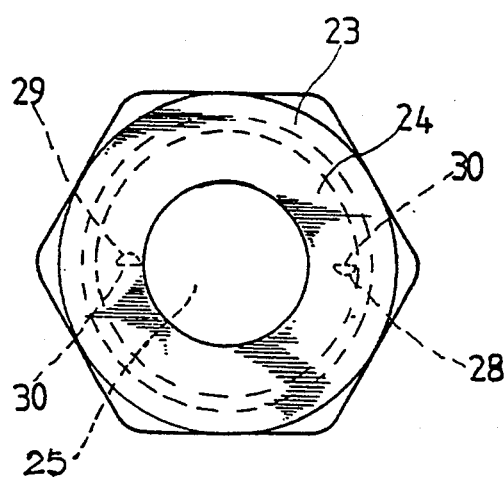
FIG. 9 is a top plan view of the compression nut of the liquid tight connector of the present invention.
Figure 10:
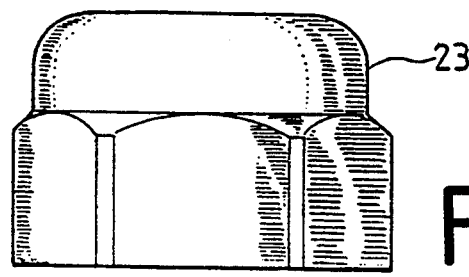
FIG. 10 is an elevation view of the compression nut of the liquid tight connector of FIG. 9.
Figure 11:
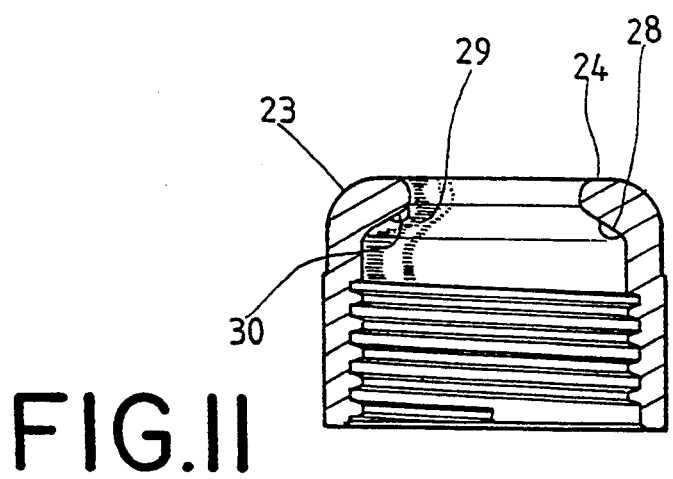
FIG. 11 is an elevated sectional view of the compression nut of the liquid tight connector of FIG. 10 showing the spherical bumps.
Figure 12:
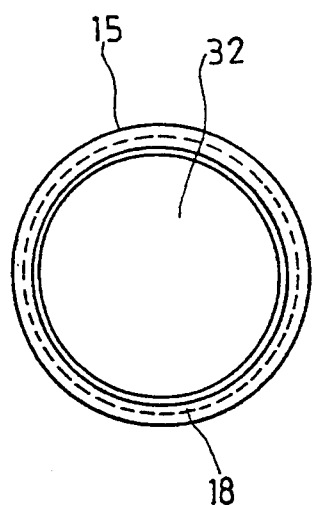
FIG. 12 is a top plan view of the gland of the liquid tight connector of the present invention.
Figure 13:
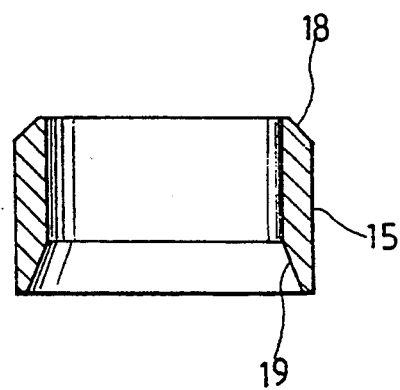
FIG. 13 is an elevated sectional view of FIG. 12.
Figure 14:
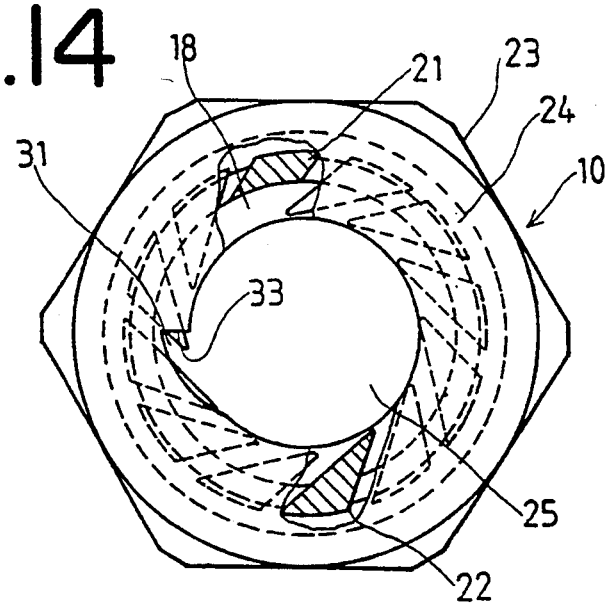
FIG. 14 including a cable is a top plan view of another embodiment of the liquid tight connector of the present invention in open position partially cut away.
Figure 15:
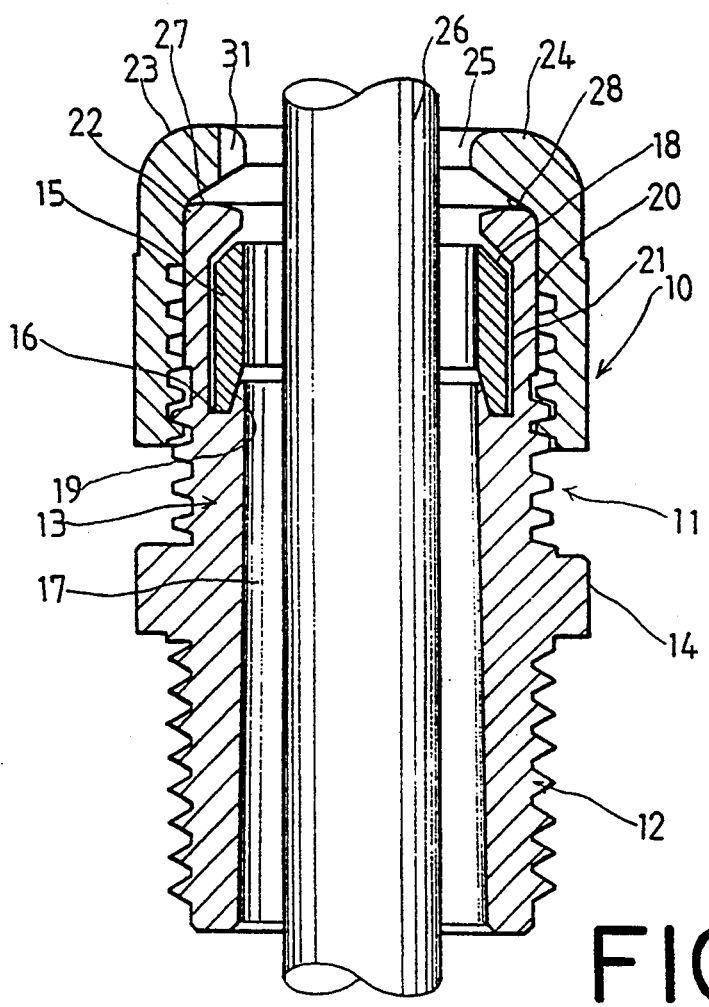
FIG. 15 is an elevated sectional view of FIG. 14.

The conical internal surface 27 has a lower spherical bump 28 and an upper spherical bump 29. As best can be seen in FIGS. 9 and 11, each spherical bump 28, 29 has a flat 30. As shown in FIGS. 14–17 the threaded compression nut 23 has a dome 24 with an opening 25, through which an elongated round object 26 may pass. The end bevel 19 of the gland 15 is engaged in the annular channel 16 of the front portion 13 of the body 11 within the fingers 20, with the flats 21 opposing the gland 15 and the gland 15 positioned beneath the triangular ends 22 of the fingers 20. The inside of the dome 24 of the compression nut 23 has a conical internal surface 27.

The conical internal surface 27 has a lower spherical bump 28 and a flat (not shown).

In lieu of an upper spherical bump 29 is a notch 31 extending from the conical internal surface 27 to the outside of the dome 24.

The body 11, as shown in FIGS. 5–8 has an end portion 12 and a front portion 13. The end portion 12 and front portion 13 are separated by a shoulder 14. The body 11 is hollow, having a central passage 17 therethrough. The body 11 has resilient fingers 20. The fingers 20 have inwardly facing flats 21 and inwardly extending triangular ends triangular ends 22.

Operation

In use, the liquid tight connector 10 may either be affixed in a liquid tight manner in an aperture and then have the cable, tube or rod 26 pass through it and locked in liquid tight engagement. Optionally, the cable, tube or rod 26 may be mounted through the liquid tight connector 10, after which the liquid tight connector 10 may be engaged in position along the cable, tube or rod 26, or the liquid connector 10, then affixed in an opening and then have the cable, tube or rod 26 tightly engaged.

The liquid tight connector 10 is engagable in liquid tight engagement, in an opening, by means well known in the art.

As shown in the figures, the end portion 12 is threaded. Thus, one means of engagement would be with a screw (not shown).

By the same token, for liquid tight engagement of the liquid tight connector 10 in an opening, "O" rings or washers (not shown) may be used for further liquid tight security.

In use, the gland 15, with its front end bevel 18 and rear end bevel 19, is engaged with the rear end bevel 19 in the annular channel 16. The walls of the gland 15 are against the flats 21 of the fingers 20. The gland 15 has an opening 32 therethrough, substantially the diameter of the central passage 17.

The triangular ends 22 of the fingers 20 extend over the front of the gland 15 and cradle the gland 15 within the fingers 20, between the inner portion of the triangular ends 22, at the bevel 18 and the annular channel 16. The annular channel 16 is reciprocally shaped to receive the rear end bevel 19 of the gland 15.

It is preferable to provide the connector 10 of the present invention with the compression nut 23 and the gland 15 already engaged.

It is desirable that the compression nut 23 be held against vibration loosening. This is important, since the compression nut 23 might get lost and be difficult to replace, or if separated, just requires more expensive labor in the use of the liquid tight connector 10.

The mode of protecting the compression nut 23 enables effective vibration proof grasping of the compression nut 23. As the compression nut 23 is screwed down on the threads, the conical internal surface 27 of the compression nut 23 engages the fingers 20 in a bearing relationship, biasing them inward towards the center of the central passage 17. The fingers 20 encounter the lower spherical bump 28 and cam over it as a bearing surface. The flat 30 on the further side of the lower circle bump 28 acts as a pawl, so that the finger 20 and the compression 23 are engaged in a vibration proof manner, so that the compression 23 cannot disengage.

Without substantially narrowing the opening to the central passage 17, the compression nut 23 is engagable in a vibration proof relationship with a few turns of the compression nut 23.

when in use, the compression nut 23 may then be fully tightened against the cable, tube or rod 26. The fingers 20 continue to cam on the conical internal surface 27 of the compression 23. The flats 21 of the fingers 20 tightly engage the gland 15 against the cable, tube or rod 26 in liquid tight engagement.

As can be seen in FIG. 3, the angulation of the apices of the triangular ends 22, causes a camming of the triangular ends 22, circumferentially, with regard to the cable, tube or rod 26.

This configuration tightly holds the gland 15 against the cable, tube or rod 26, around its entire circumference. The triangular ends 22 of the fingers 20 further, independently grasp the cable, tube or rod 26. This independent grasping is both liquid tight and serves as a strain relief holding of the cable, tube or rod 26. The overlapping of the apices of the triangular ends 22, camming on each other, provide a tight, circumferential grasp with no room for liquid seepage and, further, tightly engage the glad 15 against the cable, tube or rod 26 in an effective liquid tight seal.

As the compression nut 23 is screwed down on the threads of the front portion 13, the fingers 20 are brought in contact with the upper spherical bump 29, which has a flat 30, as can be seen in FIGS. 9 and 11. This flat acts as a pawl, so that the engaged finger 20 is not likely to be disengaged in use, or by vibration, locking the liquid tight connector 10 onto the cable, tube or rod 26.

Depending upon the diameter of the cable, tube or rod 26, the fingers 20, with their triangular ends 22, camming on each other, can reduce to a very small diameter. Thus, the configuration of the fingers 20 provides a wide latitude of variant size diameters of cable, tube or rod 26, which can be engaged by a single liquid tight connector 10. There is great economy effected in being able to use a minimum number of different sizes for a multitude of applications. This saves the cost of manufacturing, as well as the labor in selecting proper sized multiple liquid tight connectors 10.

Figure 16:
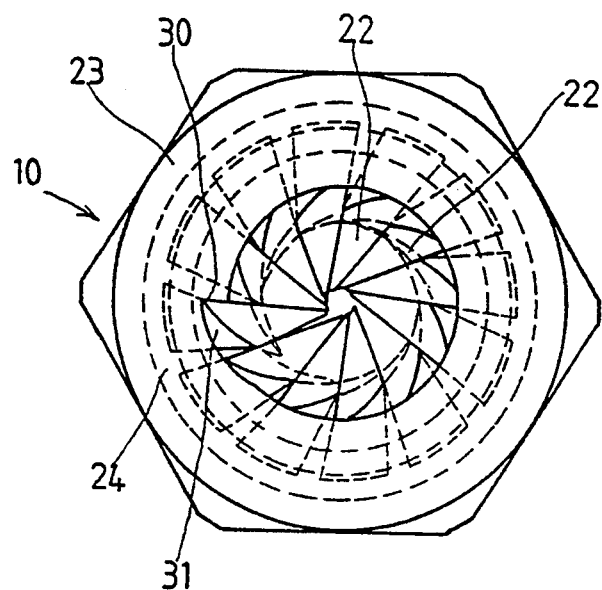
FIG. 16 is a top plan view of the liquid tight connector similar to FIG. 15 closed position without a cable.
Figure 17:
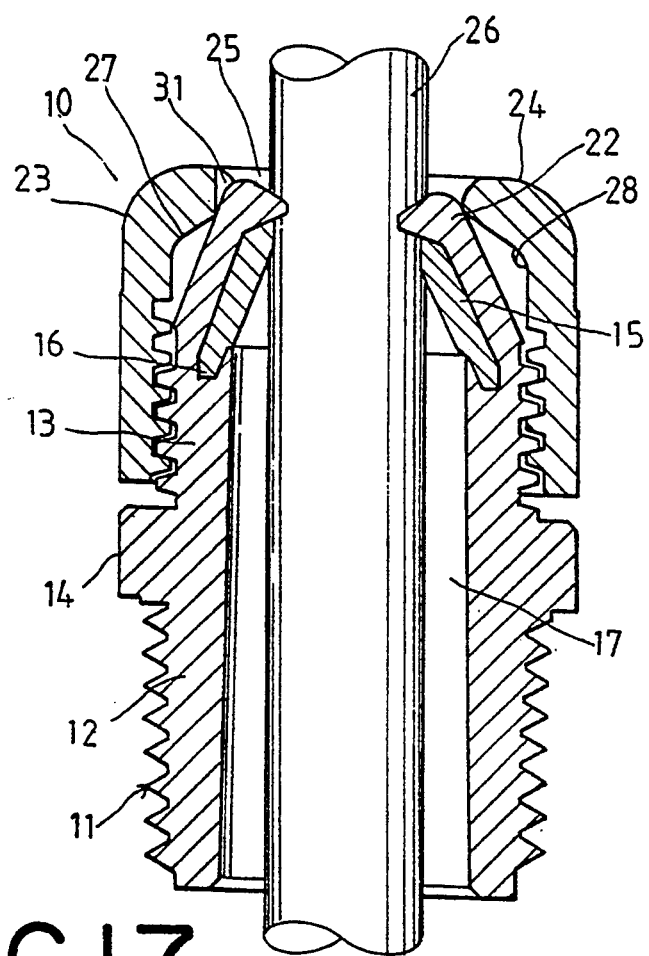
FIG. 17 is an elevated sectional view similar to FIG. 16 including a cable.

As can be seen in FIGS. 14 through 17, the compression nut 23 may be provided with a notch 31, passing from the inside of the conical internal surface 27, to the outside of the dome 24 of the compression nut 23. The notch 31 has a flat 33. The triangular ends 22 of the fingers 20 cam into the notch 31 when the compression nut 23 is sufficiently screwed down. The notch 31 may be in lieu of or in addition to the upper spherical bump 29. As can be seen in FIG. 16, the triangular ends 22 cam into the notch 31 and are engaged against loosening by the flat 33, which acts as a pawl.

The notch 31 provides a large, physical grasping surface for the triangular end 22 of a finger 20, to provide an even more rigid lock against disengagement of the compression nut 23 when tightened.

Although prior art fingers have had angulated slots extending over a gland, such as in U.S. Pat. No. 4,048,872, the spherical bumps 28 and 29 provide an effective bearing surface for catching the edges of the fingers 20 in the flat 30, acting as an effective pawl, along the length of the fingers 20, as they move forward towards the opening 25 of the compression nut 23. The triangular ends 22 are not limited in their grasping ability and fully cam against the cable, tube or rod 26, firmly grasping it without distorting, since the grasp is tangent and circumferential at all points around the cable, tube or rod 26.

The fingers in U.S. Pat. No. 4,787,657, while overriding the sealing element, provides longitudinally alternating triangular fingers which eventually interact to stop each other and do not provide the uniformity of circular grasping of the present invention.

Other finger configurations of the prior art grasp cable, tubing or a rod, but without the uniform stress of the overlapping triangular ends 22 of the present invention.

Similar bushings have locking steps which keep the compression nut from rotating off in use. These locking steps are among other things long protruding ridges which may be along an angled surface inside the compression nut and which lock between the fingers as the compression nut 23 turns. These steps work for fingers that only close together, because the angle of the finger and the locking step remain the same. The fingers 20 on the connector 10 of the present invention not only come together, but as they touch the triangular ends 22, forces the triangular ends 22 to twist inward. A long locking pawl would not fit between the fingers 20 as they twist inward. The spherical bumps 28, 29 with flats 30 are located along the angled or conical internal surface 27 of the compression nut 23 23. The spherical shape of the lower spherical bump 28 and upper spherical bump 29 allows the fingers 20 to ride up over the spherical bumps 28, 29 in one direction. The other side has a flat 30 to lock the fingers 20 so they can only move in one direction. The upper spherical bump 29 and lower spherical bump 28 fit between the fingers 20 one at a time, more like a pin than a ridge and either the flat 30 or the edge of the flat 30 locks the finger 20. The spherical bumps 28, 29 are located in different places along the conical internal surface 27 to catch the fingers 20 as they move up along the threads of the body 11 and the compression nut 23.

Similar connectors have fingers which push on a gland, then together they hold the elongated round object. This type of bushing works well for liquid tight connectors, but the strain relief action only works when the gland is pushed very tightly to the elongated round object. Prior art liquid tight connector may require many different size glands to hold a wide diameter range of elongated round objects. The fingers 20 of the connector 10 are in two parts, triangular ends 22 and flats 21 each with a separate action. The flat 21 is wider, flatter and much more flexible than the triangular ends 22. The flexibility of the flat 21 allows it to stay flat for just the right push against the gland 15 and cable, tube or rod 26, while the rigid triangular ends 22 bend inward above the gland 15. The triangular ends 22 are rigid with a rounded base and extend above the gland 15. The triangular ends 22 is driven directly into the cable, tube or rod round 26 as the compression nut 23 is turned, giving a strong strain relief action without the gland 15 to soften its holding power. The triangular ends 22 interlock as the compression nut 23 is screwed down and the offset angles force the triangular ends 22 to twist with a cam action inward, giving each triangular end 22 a very long reach. This action gives the connector 10 a large cable, tube or rod round 26 diameter range.

The terms and expression which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A liquid tight connector to engage a substantially elongated round object in liquid tight engagement in an opening, said liquid tight connector including a body, said body including a front portion and an end portion, said front portion and end portion having an open passage therethrough, means to engage said end portion in said opening, said front portion including an outer extremity; an inner extremity; a set circumferential fingers; and threads, a gland, said gland being thin; flexible; and having a central passage therethrough, means in said front portion to engage said gland in said body surrounding said open passage, said fingers having an integral inwardly facing longitudinal portion; and an end portion, said finger's end portion triangular in transverse cross section; and extending to and defining said front portion's outer extremity, said front portion's threads located at said inner extremity, said gland when engaged in said front portion of said body and said fingers not compressed is cradled by said inwardly facing longitudinal portions and within said triangular end portions; and said inwardly facing longitudinal portion of said fingers substantially parallel to said gland and radially offset from said gland, said fingers to liquid tight engage said elongated round a compression nut, said nut including internal threads; a sloped internal surface; and an object receiving opening therethrough, said compression nut's internal threads engagable on said front portion threads, at least one spherical bump on said sloped internal surface, said at least one spherical bump also including a flat bearing surface, said flat bearing surface acting as a ratchet to lockingly engage said fingers, said fingers cammable over said at least one spherical bump, and said gland compressible within said fingers to liquid tight lockingly engage said elongated round object as said compression nut is screwed down over said fingers on said front portion's threads as said fingers cam over said spherical bump and said bearing surface, said spherical bump and said bearing surface engage said fingers to prevent unscrewing of said compression nut form said front portion.

2. The invention of claim 1 wherein said body includes a shoulder between said end portion and said front portion.

3. The invention of claim 1 wherein said triangular ends include sides, said sides defining apices.

4. The invention of claim 3 wherein said apices normally extend over said gland and one said side of each apex is substantially tangent to said elongated object when said elongated object is in said open passage and said compression nut is screwed down over said fingers on said front portion's threads forcing said fingers inwardly.

5. A invention of claim 4 wherein said fingers including said triangular ends and said inwardly facing longitudinal portions are spaced apart by slots, said slots including adjacent sides of said triangular ends.

6. The invention of claim 5 wherein one said side of each said triangular end is on a plane substantially tangent to the circumference of said open passage when said compression nut is not screwed down over said fingers on said front portion's threads.

7. The invention of claim 1 wherein said compression nut includes an outer dome.

8. The invention of claim 7 wherein said compression nut includes a notch, said notch to receive at least one said finger, said notch to hold said at least one finger to prevent unscrewing of said compression nut from said front portion.

9. The invention of claim 8 wherein said notch extends longitudinally from said outer dome to said sloped internal surface at said object receiving opening.

10. The invention of claim 9 wherein said notch includes a flat portion, said flat portion integral to and within said notch, said flat portion acting as a ratchet to lockingly engage said fingers, said flat portion to hold at least one said finger to prevent unscrewing of said compression nut from said front portion as said compression nut screwed down over said fingers on said front portion threads and as said fingers protrude into said notch.

11. The invention of claim 1 wherein said compression nut includes a first and a second spherical bump on said sloped internal surface.

12. The invention of claim 11 wherein said first spherical bump is close to said compression nut object receiving opening, said second spherical bump is spaced away beneath said first spherical bump.

13. The invention of claim 1 wherein said gland includes a first end and second end, at least one bevel, said at least one bevel positioned at one end close to said open passage near said compression nut object receiving opening tapering toward said open passage, said gland to engage said elongated round object free of said triangular ends when said compression nut is screwed down over said fingers on said front portion's threads.

14. The invention of claim 13 wherein said gland includes a further bevel at said other end, said further bevel engagable in said means in said front portion to engage said gland in said body.

* * * * *

UNITED STATES PATENT AND TRADEMARK OFFICE
CERTIFICATE OF CORRECTION

PATENT NO. : 5,405,172
DATED : April 11, 1995
INVENTOR(S) : Thomas M. Mullen, Jr.

It is certified that error appears in the above-identified patent and that said Letters Patent is hereby corrected as shown below:

Cover Page at [73] Assignee: - correct and change "Tex" to "NJ"

Signed and Sealed this

Twenty-ninth Day of August, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. :  5,405,172
DATED      :  April 11, 1995
INVENTOR(S) : Thomas M. Mullen, Jr.

It is certified that error appears in the above-identified patent and that said Letters Patent is hereby corrected as shown below:

Claim 1, line 46, after "gland," delete from "said", line 46, to "round", line 47.
       line 63, insert and change "form" to -- from --

Signed and Sealed this

Twelfth Day of September, 1995

Attest:

BRUCE LEHMAN

Attesting Officer      Commissioner of Patents and Trademarks